Patented Aug. 29, 1950

2,520,609

UNITED STATES PATENT OFFICE 2,520,609

CROSS-LINKED POLYMERIC MATERIALS AND METHOD OF MAKING SAME

Paul W. Morgan, Kenmore, N. Y., assignor to E. I. du Pont de Nemours & Company, Wilmington, Del., a corporation of Delaware No Drawing. Application October 16, 1947, Serial No. 780,307

14 Claims. (Cl. 260—213)

This invention relates to polymeric materials. More particularly, it relates to new polymeric materials and to the method of making the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

It is an object of this invention to provide a new and useful polymeric material.

Another object of this invention is to provide a method of preparing polymeric materials having improved properties.

An additional object of this invention is to provide a new and improved method of cross-linking polymeric materials.

A still further object of this invention is to provide a process of cross-linking polymeric materials, which process is easy of accomplishment and readily controlled.

Other and additional objects of the invention will appear hereinafter.

The objects of this invention are accomplished, in general, by cross-linking one or a plurality of polymeric materials containing an active functional group by reaction thereof with a derivative of dithiocarbamic acid hereinafter more fully explained.

In one embodiment of the invention, the cross-linking reagent is incorporated in a solution of the polymeric material and, after forming a shaped article, effecting the cross-linking by heat. In another embodiment of the invention, a shaped article of the polymeric material is impregnated with the cross-linking reagent and the impregnated article subjected to heat. Alternatively, the shaped article can be immersed in a solution of the cross-linking agent and the vessel containing the immersed article subjected to heat. When the cross-linking reagent contains a mercapto group, depending on the time and temperature of the heating step, there can be produced an intermediate which upon mild oxidation is cross-linked.

The present invention will be more clearly understood by reference to the following detailed examples, it being understood, however, that these examples are illustrative of certain embodiments of the invention and that the scope of the invention is not to be limited thereto. The proportions are parts by weight.

EXAMPLE 1

10 parts of hydroxyethylcellulose acetate chloroacetate (0.33 hydroxyethyl, 2.33 acetyl, and 0.47 chloroacetyl groups per glucose unit) were dissolved in 57 parts of acetone, and 0.65 part of cross-linking reagent added and thoroughly stirred in. The resulting mixture was cast into thin films and heated on the casting plates. The specific cross-linking reagent and the periods of time the film was heated are given in the following table:

*Table*

| | Cross-Linking Reagent | Temp., °C. | Time | Swelling in 95% Acetone |
|---|---|---|---|---|
| | | | | Per cent |
| (a) | Sodium diethyldithiocarbamate. | 100 | 15 min.. | 200 |
| (b) | Zinc dibutyldithiocarbamate.. | 100 | 30 min.. | 100 |
| | | 100 | 18 hrs... | 40 |
| (c) | Piperidinium pentamethylene-dithiocarbamate. | 100 | 1 hr..... | 1 65 |
| (d) | Tetramethylthiuram monosulfide. | 100 | 20 hrs... | 30 |
| (e) | Tetramethylthiuram disulfide. | 100 | 20 hrs... | 30 |
| | | 170 | 2 min... | 50 |
| (f) | Dipentamethylenethiuram tetrasulfide. | 100 | 20 hrs... | 30 |
| (g) | 2,2'-Dithiazolinyl disulfide.... | 100 | 1.5 hrs... | 140 |
| | | 100 | 3 hrs.... | 60 |
| (h) | 2-Mercaptothiazoline.......... | 100 | 20 hrs... | 45 |
| | | 170 | 2 min... | 30 |
| (i) | 2-Mercapto-4,5-dimethylthiazole. | 100 | 20 hrs... | 35 |
| | | 170 | 2 min... | 70 |
| (j) | 2-Mercaptobenzothiazole...... | 100 | 20 hrs... | 40 |
| | | 170 | 2 min... | 80 |
| (k) | 2-Mercaptobenzoxazole........ | 100 | 20 hrs... | 50 |
| | | 170 | 2 min... | 100 |

[1] Highly swollen.

Each of the films consisted of a cross-linked polymer and was clear, not brittle and not markedly stiffened. Each showed improvement in softening point and did not break under light loads below their decomposition points. With the exception of the film produced by (c), which became brownish yellow, none of the other films showed much color.

EXAMPLE 2

A film was prepared as in Example 1, using 6.5% 2-mercaptothiazoline as the cross-linking reagent. After this film was heated at 100° C. for 2 hours, it was no longer soluble in dry acetone but dissolved in 95% aqueous acetone. When this heat-treated film was further subjected to mild oxidation by 2% alcoholic iodine at 50° C. for 5 minutes, it became quite insoluble in aqueous acetone. The film at both stages of the process was clear.

EXAMPLE 3

Yarns of cellulose acetate chloroacetate (2.44 acetyl and 0.31 chloroacetyl groups per glucose unit) were suspended in an excess of a 5% solution of 2-mercaptothiazoline in xylene and the vessel was heated on a steam-bath for 1 hour. The resulting yarn, after washing with non-solvent, contained nitrogen and sulfur, but was easily soluble in 95% aqueous acetone. Treatment with 2% alcoholic iodine at 50° C. for 10 minutes insolubilized the yarn.

EXAMPLE 4

10 grams of hydroxyethylcellulose acetate (0.13 hydroxyethyl and 2.34 acetyl groups per glucose unit) were dissolved in 50 cc. glacial acetic acid. To this solution were added 6.7 grams of 2-mercaptothiazoline, 1.69 grams of paraformaldehyde and 0.07 cc. of concentrated sulfuric acid. The mixture was heated at 60° C. with stirring for 1 hour and the product precipitated in water. It contained 0.65% N, which corresponds to 0.13 thiazolinylmercaptomethyl group per glucose unit.

A 15% solution of the polymeric material, prepared as above described, in acetone plus 5% (by weight based on the cellulose derivative) of ethyleneglycol-bis-(monochloroacetate) was cast into a clear, tough film, which was baked 24 hours at 100° C. At this time, the film was still tough and flexible, swelled only 100% in acetone without disintegration, and did not break under light load up to 300° C.

EXAMPLE 5

10 parts of the polymer described in Example 4, 2 parts of hydroxyethylcellulose acetate chloroacetate (0.3 hydroxyethyl, 2.33 acetyl, and 0.47 chloroacetyl groups per glucose unit) were dissolved together in 98% aqueous acetone and cast into clear, tough films. The air-dried films were heated at 100° C. and became insoluble in 30 minutes but remained clear and flexible. After 3 hours at 100° C., the films were swollen only 35% by acetone.

The films did not fuse or break under light load up to 300° C.

Hydroxyethylcellulose acetate chloroacetate disclosed in Examples 1, 2 and 5 is a new compound and forms the subject-matter of application Serial No. 774,443, filed September 16, 1947, now Patent No. 2,512,960 issued June 27, 1950.

Hydroxyethylcellulose acetate chloroacetate is synthesized, in general, by acetylating hydroxyethylcellulose chloroacetate or by chloroacetylating hydroxyethylcellulose acetate. In either method a homogeneous or a heterogeneous reaction system may be used. To obtain preferred products the amounts of the various ester groups in hydroxyethylcellulose acetate chloroacetate are carefully selected.

The above-detailed examples illustrate embodiments of the invention wherein specific thiocarbamates are reacted with specific polymeric materials containing specific reactive groups. The present invention is, however, not to be restricted to such specific polymeric materials and specific thiocarbamates.

The polymeric material can be any polymeric material, such as vinyl polymers, polyacrylic compounds, polymeric resins, cellulose derivatives, linear condensation polymers, for example synthetic resins, synthetic linear condensation polyamides, polyesters, polyethers and polyanhydrides and the like provided only that the polymeric material contains a reactive or functional group. Illustrative examples of reactive groups which may be contained in the polymeric material are thiocyano groups, halogen esters, sulfate esters and sulfonate esters, for example, mono-, di- or trichloroacetates, chlorketals, chloracetals, sulfates, alkyl or aryl sulfates, and alkyl, aralkyl or aryl sulfonates.

Several additional illustrative examples of polymers with reactive groups which can be used are:

Ethylcellulose chloroacetate
Ethylcellulose toluenesulfonate
Cellulose acetate thiocyanoacetate
Cellulose acetate toluenesulfonate
Chlorinated rubbers
Thiocyanated rubbers
Chlorinated polyethylene
Polymers of beta-chloro-ethyl acrylate
Copolymers of beta-chloro-ethyl acrylate
Polymers of beta-chloro-ethyl methacrylate
Copolymers of beta-chloro-ethyl methacrylate
Polymers of vinyl beta-chloro-ethyl ether
Copolymers of vinyl beta-chloro-ethyl ether
Polyvinyl chloroacetate
Polyvinyl chloroacetal
Cellulose sulfate
Cellulose acetate sulfate
Polyvinyl sulfate The cross-linking agents of this invention are derivatives of dithiocarbamic acid and in which derivatives the substituents contain not more than 8 carbon atoms. In general, the cross-linking agent should have a fair solubility (2% or more) in aqueous or organic solvent medium, by means of which it can be mixed with a dissolved polymer or impregnated into a shaped polymer. They are preferably of three structural types: (a) no heterocyclic rings; (b) hetero-ring containing nitrogen; and (c) hetero-rings containing both nitrogen and sulfur.

The (a) group includes dithiocarbamic salts and esters and the thiuram sulfides. The nitrogen substituents may be alkyl groups (methyl, ethyl, butyl, isobutyl, cyclohexyl, hexyl, octyl, etc.), aryl groups (phenyl, tolyl, xylyl), or aralkyl (benzyl, p-methylbenzyl, phenylethyl). The ester group may have a like structure.

The (b) group also consists of dithiocarbamic salts and esters and the thiuram sulfides. In this embodiment, the most stable rings are five and six membered (tetramethylene and pentamethylene amino groups). There can be ring substitution with alkyl groups. The cyclic secondary amines can also form the salt group (piperidine, tetramethyleneamine, N-methylpiperidine).

The (c) class includes the thiazoles, thiazolines, and their sulfides. The thiazolines may have up to 4 carbon substituents. These can be any of the groups listed under (a). The thiazoles can bear two such groups or a fused aromatic ring, which could be benzo, naphtho, methylbenzo, ethylbenzo, etc.

The following materials are illustrative specific examples of dithiocarbamate derivatives which can be used in this invention:

Ammonium diethyldithiocarbamate
Methylamine dibutyldithiocarbamate
Diethylamine dipropyldithiocarbamate
Tributylamine dimethyldithiocarbamate
Sodium monobutyldithiocarbamate
Potassium dioctyldithiocarbamate
Lithium diamyldithiocarbamate
Zinc dibenzyldithiocarbamate
Cadmium diphenyldithiocarbamate
Copper ditolyldithiocarbamate
Barium dixylyldithiocarbamate
Strontium diphenylethyldithiocarbamate
Magnesium di(2-ethylhexyl)dithiocarbamate
Zinc ethylbutyldithiocarbamate Any combination of the above anions and cations:

Tetraethylthiuram monosulfide
Tetrabutylthiuram monosulfide
Bis-pentamethylenethiuram monosulfide
Tetraethylthiuram disulfide
Tetraamylthiuram disulfide
Tetraphenylthiuram disulfide
Tetrabenzylthiuram disulfide
Tetraethylthiuram tetrasulfide
Tetrapropylthiuram tetrasulfide
Dipentamethylenethiuram disulfide
Ditetramethylenethiuram monosulfide
2-mercapto-4,5-dimethylthiazoline
2-mercapto-4,5-diethylthiazoline
2-mercapto-4-ethyl-5-butylthiazoline
2-mercapto-4,5-dibutylthiazoline
2-mercapto-4-methylthiazoline
2-mercapto-5-ethylthiazoline
2-mercapto-4-phenyl thiazoline
2-mercapto-4-benzylthiazoline
2,2'-bis-(4,5-dimethylthiazolinyl) disulfide
2,2'-bis-(4,5-diethylthiazolinyl) disulfide
2,2'-bis-(4-ethyl-5-butylthiazolinyl) disulfide
2,2'-bis-(4,5-dibutylthiazolinyl) disulfide
2-mercapto-4,4,5,5-tetramethylthiazoline
2-mercapto-4,4,5,5-tetraethylthiazoline
2,2'-bis-(4,4,5,5-tetramethylthiazolinyl) disulfide
2,2'-bis-(4,4,5,5-tetraethylthiazolinyl) disulfide
2,2'-bis-(4-methylthiazolinyl) disulfide
2,2'-bis-(5-ethylthiazolinyl) disulfide
2,2'-bis-(4-phenylthiazolinyl) disulfide
2,2'-bis-(4-benzylthiazolinyl) disulfide
2-mercaptothiazole
2-mercapto-4-methylthiazole
2-mercapto-5-methylthiazole
2-mercapto-4,5-diethylthiazole
2-mercapto-4-methyl-5-ethylthiazole
2-mercaptonaphthothiazole
2-mercapto-4,5-diphenylthiazole
2-mercapto-4-benzylthiazole
2,2'-dithiazyl disulfide
2,2'-bis-(4-methylthiazyl) disulfide
2,2'-bis-(4,5-diethylthiazyl) disulfide
2,2'-bis-(4,5-diphenylthiazyl) disulfide
2,2'-bis-(4-benzylthiazyl) disulfide
2,2'-bis-(benzothiazyl) disulfide
Methyl diethyldithiocarbamate
Propyl dioctyldithiocarbamate
Butyl diphenyldithiocarbamate
Benzyl dimethyldithiocarbamate
Ethyl ethylbutyldithiocarbamate
Amyl tetramethylenedithiocarbamate
Phenyl dibutyldithiocarbamate Assuming that the cross-linking agent does not decompose under the conditions of the reaction, it is believed that a useful structure should preferably contain two or more functional groups from the classes, tertiary nitrogen, monosulfide, and mercaptan. Any compound which can rearrange to yield these structures is not considered to have decomposed. Primary and secondary amine groups will also react with active halogen-type compounds but a tertiary nitrogen is preferred for use with cellulose derivatives or other polymers which are easily degraded under alkaline or acid conditions.

The chemical reactions involved in the cross-linking are not known and the invention is not restricted to the theoretical explanation hereafter given. Presumably, when the cross-linking is effected by heat alone, it is obtained by the formation of an onium salt through the reaction between the tertiary nitrogen or the sulfide sulfur of the cross-linking agent with the active halogen (or other functional group) on the polymer to produce quaternary ammonium salts or sulfonium salts respectively. In the case where a compound, such as sodium diethyldithiocarbamate, is the cross-linking agent, the tertiary amine group and the sodium mercaptide group thereof are two reactive groups and they both react under the influence of heat with the reactive groups of the polymer. When the cross-linking agent contains a mercaptan group, presumably an intermediate comprising an onium salt (either a quaternary ammonium salt or a sulfonium salt) containing thiol groups is obtained, and the thiol groups converted to disulfide linkages by oxidation with a mild oxidizing agent, such as heat, air, iodine, peroxide, ferricyanide, dilute nitric acid, etc., as shown by the following equation:

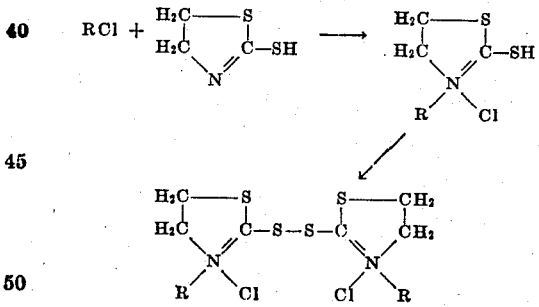

The oxidized product contains disulfide groups that serve to cross-link adjacent chains of the polymer. They can, upon treatment with a reducing agent, such as thioglycolic acid, be converted to a soluble material which can be again insolubilized by mild oxidation.

The temperature employed in the reaction is limited only by the stability of the polymer and the use for the product. Thus, in a molding or coating operation, the temperature may be above the melting point of the polymer since the reactions are relatively slow at 100° C. A temperature of at least 100° C. is desirable but not necessary.

The upper limit of concentration for the bifunctional cross-linking agent is 1 mol for each 2 reactive polymer groups to be used in the cross-linking. An excess of cross-linking agent over available reactive polymer groups promotes reaction of only one end of the reagent. When a two-step cross-linking operation is used, as with 2-mercaptothioazoline (see Examples 2 and 3), an excess of the cross-linking reagent promotes the formation of the intermediate and will not interfere with subsequent cross-linking by oxidation if the product is washed free of unreacted reagent.

As shown in the examples, the process of this invention makes possible the preparation of new cross-linked polymeric materials. The shaped article is generally prepared from a solution containing a common solvent for and in which the polymeric material and the cross-linking reagent are compatible. However, this is not essential and the process can be conducted on a preformed polymeric article. For example, a formed structure, such as a sheet of the selected polymeric material containing reactive groups, can be impregnated in sheet form with the cross-linking reagent and then heated, whereby the cross-linking can be effected. In another embodiment of the invention, the modification of the polymer to insert a reactive group and the subsequent cross-linking can be conducted on a preformed article. For example, a formed structure, such as a sheet of cellulose acetate, can be surface-esterified with chloroacetic acid or anhydride to produce a cellulose acetate chloroacetate surface and the resulting film, after impregnation in sheet form with the cross-linking reagent, baked. When the cross-linking reagent is incorporated in a formed article by an after-treatment, the formed article is immersed in a solution of the cross-linking agent, the solvent of which is a non-solvent for the polymeric material. During such impregnation, the impregnating solution can be heated.

The invention is applicable for use in the production of or the after-treatment of any shaped structure, such as yarns, filaments, molded materials, etc., as well as coating or molding compositions. The invention can also be applied to the cross-linking of a plurality, such as two or more different polymeric materials, each of which contains an active group, as hereinbefore described.

This invention provides a simple and easily controlled process for the cross-linking of polymeric materials. These cross-linked polymeric materials are insoluble in water and the common organic solvents. The invention thus provides a simple direct method for the transformation of a polymeric material into a polymeric material that is insoluble in water and organic solvents.

The process does not give rise to the formation of undesirable by-products, the cross-linked polymeric material finally obtained being substantially free of such substances and possessing a light color.

The invention produces products having higher sticking temperatures, higher zero strength, lower creep and elongation, solvent-resistance, etc. in fibers, films and coating compositions.

Since it is obvious that many changes and modifications can be made in the above-described details without departing from the nature and spirit of the invention, it is to be understood that the invention is not to be limited thereto except as set forth in the appended claims.

I claim:

1. A method of insolubilizing hydroxyethylcellulose acetate chloroacetate which comprises cross-linking the said chloroacetate by heating it at a temperature of about 100° C. with a derivative of dithiocarbamic acid selected from the class which consists of salts of dithiocarbamic acid, esters of dithiocarbamic acid, thiuram sulfides, thiazolines and thiazoles, said derivative containing no radical having more than 8 carbon atoms.

2. A process in accordance with claim 1 in which said derivative is thiuram sulfide.

3. A process in accordance with claim 1 in which said derivative is tetramethylthiuram disulfide.

4. A process in accordance with claim 1 in which said derivative is a thiazoline sulfide.

5. A process in accordance with claim 4 in which said thiazoline sulfide is 2,2'-dithiazolinyl disulfide.

6. A process in accordance with claim 1 in which said derivative is a thiazoline.

7. A process in accordance with claim 6 in which said thiazoline is 2-mercaptothiazoline.

8. The cross-linked material resulting from the reaction at a temperature of about 100° C. of hydroxyethylcellulose acetate chloroacetate with a derivative of dithiocarbamic acid selected from the class which consists of salts of dithiocarbamic acid, esters of dithiocarbamic acid, thiuram sulfides, thiazolines and thiazoles, said derivative containing no radical having more than 8 carbon atoms.

9. A cross-linked material in accordance with claim 8 in which said derivative is thiuram sulfide.

10. A cross-linked material in accordance with claim 8 in which said derivative is tetramethylthiuram disulfide.

11. A cross-linked material in accordance with claim 8 in which said derivative is a thiazoline sulfide.

12. A cross-linked material in accordance with claim 11 in which said thiazoline sulfide is 2,2'-dithiazolinyl disulfide.

13. A cross-linked material in accordance with claim 8 in which said derivative is a thiazoline.

14. A cross-linked material in accordance with claim 13 in which said thiazoline is 2-mercaptothiazoline.

PAUL W. MORGAN.

REFERENCES CITED

The following references are of record in the file of this patent:

UNITED STATES PATENTS

| Number | Name | Date |
| --- | --- | --- |
| 2,373,135 | Maxwell | Apr. 10, 1945 |
| 2,378,898 | Burke | June 26, 1945 |
| 2,405,008 | Berry et al. | July 30, 1946 |
| 2,418,499 | Burke | Apr. 8, 1947 |

FOREIGN PATENTS

| Number | Country | Date |
| --- | --- | --- |
| 5,117 | Australia | Dec. 8, 1926 |